(12) United States Patent
Gruchalski et al.

(10) Patent No.: US 9,412,374 B2
(45) Date of Patent: Aug. 9, 2016

(54) SPEECH RECOGNITION HAVING MULTIPLE MODES IN A MOTOR VEHICLE

(71) Applicants: AUDI AG, Ingolstadt (DE); VOLKSWAGEN AG, Wolfsburg (DE)

(72) Inventors: Gerd Gruchalski, Ingolstadt (DE); Tanya Kancheva, Mountain View, CA (US)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/436,177

(22) PCT Filed: May 18, 2013

(86) PCT No.: PCT/EP2013/001488
§ 371 (c)(1),
(2) Date: Apr. 16, 2015

(87) PCT Pub. No.: WO2014/060054
PCT Pub. Date: Apr. 24, 2014

(65) Prior Publication Data
US 2015/0269939 A1 Sep. 24, 2015

(30) Foreign Application Priority Data
Oct. 16, 2012 (DE) .................. 10 2012 020 204

(51) Int. Cl.
*G10L 15/32* (2013.01)
*B60R 16/037* (2006.01)
(Continued)

(52) U.S. Cl.
CPC ............. *G10L 15/32* (2013.01); *B60R 16/0373* (2013.01); *G01C 21/3608* (2013.01); *G10L 15/30* (2013.01); *G10L 2015/228* (2013.01)

(58) Field of Classification Search
None
See application file for complete search history.

(56) References Cited

U.S. PATENT DOCUMENTS

2002/0046023 A1* 4/2002 Fujii .................. G10L 15/32
704/231
2002/0072905 A1 6/2002 White et al.
(Continued)

FOREIGN PATENT DOCUMENTS

DE 102012020204.0 10/2012
EP 1341363 9/2003
(Continued)

OTHER PUBLICATIONS

English Language the International Search Report for PCT/EP2013/001488, mailed Sep. 5, 2013, 2 pages.

*Primary Examiner* — Qian Yang
(74) *Attorney, Agent, or Firm* — Staas & Halsey LLP

(57) ABSTRACT

In a method for speech recognition in a motor vehicle, speech inputs from a user are received and at least one of them is supplied to a vehicle-internal onboard speech recognition system without raising a query with the user. The speech recognition system generates a first recognition result, which, however, is not necessarily always correct and thus it has often been necessary up to now to raise a query with the user or allow the user to make corrections. The method provides reliable speech recognition that distracts the user in the motor vehicle as little as possible from the traffic. To this end, a processing unit supplies all or part of the speech input also to a vehicle-external offboard speech recognition system, which transmits a second recognition result to the processing unit. Depending on the first and the second recognition results, the speech text is then determined.

18 Claims, 1 Drawing Sheet

(51) Int. Cl.
*G01C 21/36* (2006.01)
*G10L 15/30* (2013.01)
*G10L 15/22* (2006.01)

(56) References Cited

U.S. PATENT DOCUMENTS

| | | |
|---|---|---|
| 2006/0235684 A1 | 10/2006 | Chang |
| 2007/0276651 A1* | 11/2007 | Bliss ................ G10L 15/30 704/9 |
| 2008/0027600 A1* | 1/2008 | Bierdeman .......... H04L 67/141 701/24 |
| 2009/0198496 A1* | 8/2009 | Denecke ............... G10L 15/26 704/257 |
| 2011/0184740 A1 | 7/2011 | Gruenstein et al. |
| 2011/0282666 A1* | 11/2011 | Washio ................ G10L 25/48 704/246 |
| 2012/0128143 A1* | 5/2012 | Rudman ............. H04M 1/2478 379/110.01 |
| 2013/0262126 A1* | 10/2013 | Schalk ................ G01C 21/26 704/275 |

FOREIGN PATENT DOCUMENTS

EP 1408304 4/2004
WO PCT/EP2013/001488 5/2013

* cited by examiner

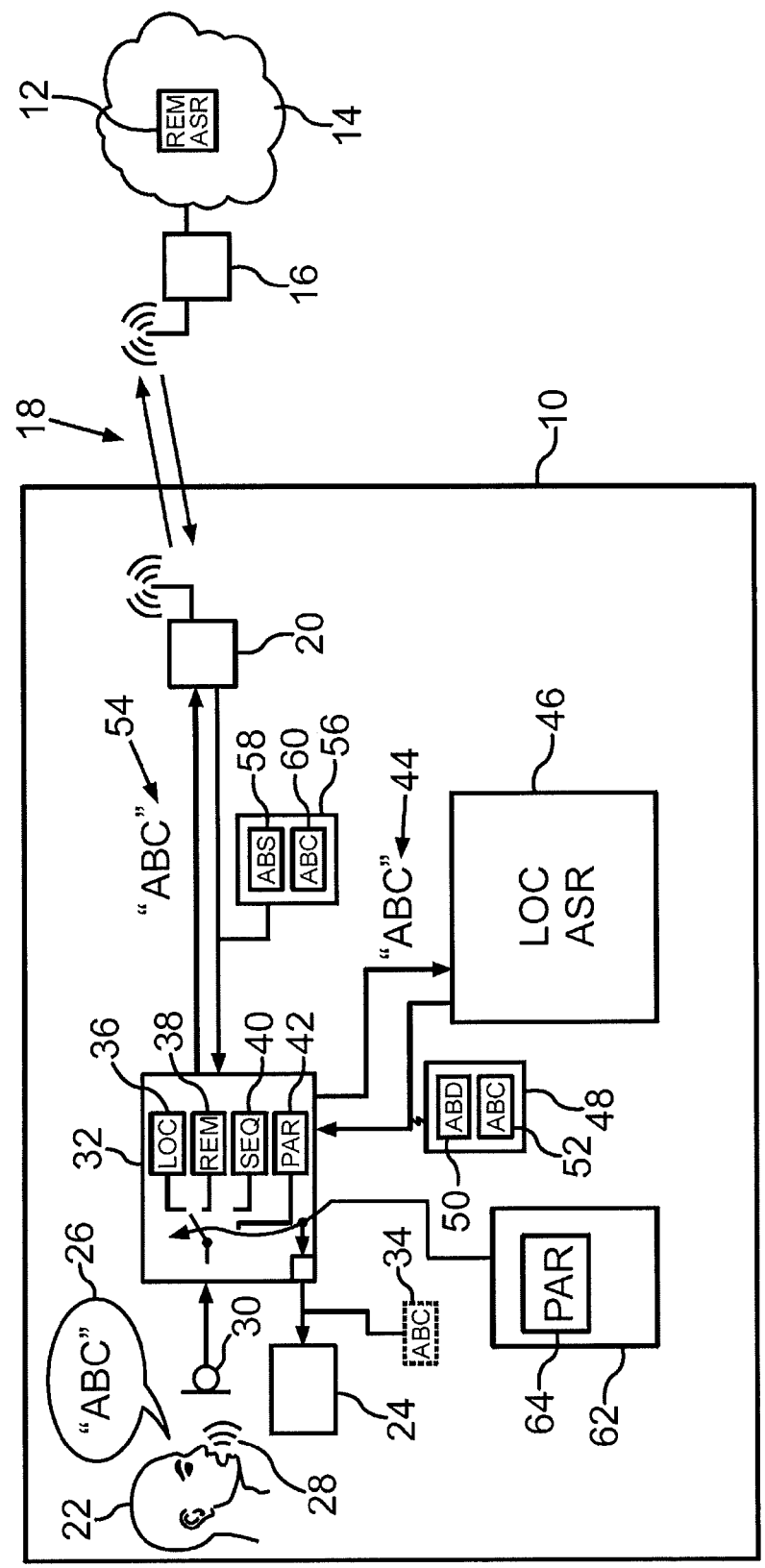

SPEECH RECOGNITION HAVING MULTIPLE MODES IN A MOTOR VEHICLE

CROSS REFERENCE TO RELATED APPLICATIONS

This application is based on and hereby claims priority to International Application No. PCT/EP2013/001488 filed on May 18, 2013 and German Application No. 10 2012 020 204.0 filed on Oct. 16, 2012, the contents of which are hereby incorporated by reference.

BACKGROUND

The invention relates to a method for speech recognition in a motor vehicle. On the basis of a voice input by a user, a vehicle-internal speech recognition unit, which is referred to as an onboard speech recognition unit in this case, is used to ascertain a spoken text from the voice input. The invention also includes an infotainment system for a motor vehicle, and a motor vehicle having a processing device for performing speech recognition.

Today's infotainment systems in vehicles use systems for automatic speech recognition or ASR in order to accept voice inputs from the drivers. These ASRs may be situated either in the vehicle itself (onboard) or on remote servers (online). The recognition apparatuses can be equipped to carry out various sets of tasks.

EP 1 408 304 A1 describes a control system for a motor vehicle that allows voice control of appliances in the motor vehicle. The recognition of individual voice inputs, that is to say the conversion thereof into a machine-processable spoken text, involves the use of a vehicle-external speech recognition unit, which is referred to as an offboard speech recognition unit within the context of this document. In this regard, the related art reveals the known practice of capturing the voice sound as a voice signal, which is then digitized and is conditioned for speech recognition by feature extraction. The extracted features are then transmitted by mobile radio to the offboard speech recognition unit, which then provides its recognition result for the motor vehicle again by mobile radio. A drawback of this solution is that there must always be a mobile radio link available in order for the speech recognition to work.

EP 1 341 363 B1 describes a driver information system that likewise uses an offboard speech recognition unit. In addition, an onboard speech recognition unit can be used for simple recognition tasks, such as recognition of single control commands. In this case, a decision unit changes between the onboard speech recognition unit to the offboard speech recognition unit when required in order to convert single voice inputs by the user into a spoken text. The offboard speech recognition unit is designed only for recognition within the context of a voice dialog in this case. By contrast, the onboard speech recognition unit understands only single command words. The advantage of a voice dialog system is that a speech recognition unit can make a query if it has not understood a particular voice input. However, a drawback of this is that this results in the driver being distracted when using the speech recognition system during a journey.

SUMMARY

One possible object relates to providing reliable speech recognition in a motor vehicle that distracts a user in the motor vehicle from the traffic situation as little as possible.

The inventors propose a method that ensures that a voice input is supplied to automatic speech recognition for producing a spoken text without any query to the user. In the event of difficulties in the speech recognition with a particular voice input, said automatic speech recognition advantageously prevents the user from being distracted from the traffic situation. In this case, the proposed method is performed by a vehicle-internal processing device that receives the voice input by the user from a vehicle-internal capture device, for example a microphone with downstream signal processing. In this case, at least one received voice input is supplied to a vehicle-internal onboard speech recognition unit via the processing device. The processing device then receives a first recognition result, that is to say a possible spoken text candidate or also a list containing a plurality of possible spoken text candidates, for example, from said onboard speech recognition unit. A spoken text candidate is a text that reproduces the voice input as a character string. Thus, if the spoken voice input is "Hello", the correct spoken text candidate is the character string "Hello". Instead of the plain text "Hello", the speech recognition result presented may also be the spoken text candidate in symbol form or as a reference to a list entry in a list of possible spoken text candidates or as an identifier (e.g. ID_0815) of the list entry.

The aim is now to reduce the possibility of a recognition error occurring on the basis of this first recognition result, that is to say of an incorrect spoken text being output, which would unnecessarily distract the user. To this end, the processing device also supplies all or some of the voice input to a vehicle-external offboard speech recognition unit. The processing device then receives a second recognition result from said offboard speech recognition unit, that is to say again a spoken text candidate or a list comprising a plurality of spoken text candidates. The spoken text that is finally output as the recognition result is then ascertained by the processing device on the basis of both the first and the second recognition result.

The proposed method has the advantage that some or all of the voice input is supplied to dual speech recognition, namely both to the vehicle-internal speech recognition and to the vehicle-external speech recognition. The spoken text that is ultimately output as the recognition result then has a higher probability of corresponding to what the user actually said. In connection with the proposals, a voice input is understood to mean either the converted sound signal, that is to say an analog signal or a digital signal, or else a series of features pertaining to individual signal segments, that is to say a series of mel-cepstral coefficients, for example, that has already been formed from the voice signal by inherently known feature extraction.

In one embodiment, the method provides for sequential speech recognition, in which the voice input is first of all supplied to the onboard speech recognition unit for keyword recognition and the first recognition result is received. The first recognition result is then used to extract at least one component that is unrecognizable to the onboard speech recognition unit from the voice input, and said component is then supplied to the offboard speech recognition unit. This results in the advantage that the speech recognition is first of all performed with the onboard speech recognition unit, which normally has a shorter reaction time, and only in the event of there being problems during recognition is the normally more powerful offboard speech recognition unit used. A further advantage is that the processing device can use the keyword recognition to decide to which of a plurality of possible offboard speech recognition units the voice input needs to be supplied. If the keyword recognition is used to recognize that the user wishes to stipulate a destination navigation, for example, it is accordingly possible for an offboard speech recognition unit for a navigation system to be actuated.

Another embodiment of the method provides for at least one voice input in parallel speech recognition to be supplied to the onboard speech recognition unit and independently thereof to the offboard speech recognition unit. There are then two recognition results available that each relate to the overall voice input. By way of example, the final recognition result that is output can then be that spoken text that both recognition results contain as a spoken text candidate. Another reason for using an onboard recognition unit and an offboard recognition unit in parallel is that both recognition units can cover different scopes of function. There are then not two like or similar results obtained but rather different ones. One of the two then normally has distinctly higher confidence, however, that is to say an indicative value for the correctness of the recognition, so that meaningful selection of a spoken text candidate is likewise possible.

According to another embodiment of the method, ascertainment of the spoken text involves the processing device ascertaining the spoken text from the first and second recognition results on the basis of a particular priority for a predetermined spoken text content. In this case, spoken text content means a thematic context in which the user has spoken the voice input. Thus, if, by way of example, the keyword recognition in sequential speech recognition recognizes that a navigation destination input is involved, it is then possible for a spoken text candidate of this kind that relates to a navigation destination to be purposefully selected from the second recognition result of the offboard speech recognition unit from the second recognition result. The priority for the spoken text content "Navigation" is then stipulated by the keyword recognition therefore.

According to one embodiment, the processing device ascertains the spoken text from the first and second recognition results on the basis of at least one environmental parameter. An environmental parameter of this kind describes the current recognition situation in the motor vehicle. By way of example, an environmental parameter may indicate whether the motor vehicle is queuing, where the motor vehicle is situated (for example geocoordinates from a GPS receiver), whether the vehicle is at the start or the end of a scheduled route of travel, whether the motor vehicle is currently on a journey to the workplace of the driver or whether it is on the journey back home. The journey type (e.g. office journey or home journey) can be read from an activated personal profile of the driver, for example.

Additionally or alternatively, the spoken text can also be ascertained on the basis of a current vehicle state. By way of example, the basis taken can be whether a telephone call has just been received and is being signaled to the driver by a ringtone, for example. In the same way, it is possible to check whether particular advice has just been displayed to the driver in the motor vehicle, for example a warning signal. An environmental parameter and the current vehicle state are a reliable indication of what a user has just meant by his voice input. If the driver is currently on the way home from work, for example, he will have a higher probability of a voice input meaning something that relates to his leisure time. Conversely, a driver on the way to work will more likely be arranging or preparing work-related matters, and this then likewise provides an important context for the speech recognition. If a warning is displayed to the driver, his voice input will presumably make reference to this warning. The environmental parameter and the vehicle state can be used for ascertaining the spoken text such that a recognition result that has a plurality of spoken text candidates, that is to say a plurality of possible meaningful recognition results, prompts preference or priority to be given to those that fit the respective environmental parameter and/or vehicle state.

It is particularly useful if the method involves the processing device ascertaining the spoken text from the first and second recognition results on the basis of preceding operator control actions by the user. The operator control action relates particularly to an appliance in the motor vehicle. If the user activates a navigation system in the motor vehicle, for example, and a voice input is then made within a predetermined period, for example 2 minutes or 5 minutes, without the user having activated another appliance, it can be assumed that the voice input relates to operator control of the navigation appliance.

Another embodiment of the method provides for the voice processing device to ascertain the spoken text from the first and second recognition results on the basis of statistics from preceding voice inputs. From preceding voice inputs, it is possible to ascertain what typical errors a user makes when operating a voice input system. Furthermore, it is possible to recognize what preferences the user has, that is to say the recognition context or the recognition tasks or applications or appliances for which he actually uses the speech recognition system.

Another embodiment of the method provides for the first and/or the second recognition result to comprise an N-best list, with a plurality of spoken text candidates organized according to rank, and/or for at least one probability input relating to one of the spoken text candidates to be contained in one or both recognition results. The spoken text is then ascertained on the basis of the rank of at least one spoken text candidate and/or the probability statement of at least one spoken text candidate. Particularly if the onboard speech recognition unit and the offboard speech recognition unit deliver different result lists, comparison of probability statements or evaluation of a rank of a particular spoken text candidate independently of the context allows ascertainment of which of the speech recognition units has recognized the voice input more reliably.

The rank of a spoken text candidate can be used to recognize how probable it is that a particular spoken text candidate is the correct result relative to other spoken text candidates. Probability statements can be indicated for speech recognition units in the form of log likelihood values, for example, which have the advantage that they are absolute reliability values.

A further embodiment of the method provides for at least one safety-relevant voice input to be supplied exclusively to the onboard speech recognition unit. If the onboard speech recognition unit recognizes a keyword in the voice input that indicates that the user is disclosing personal data, for example, this can be used to suppress further speech recognition by the offboard speech recognition unit.

The reason is that the method is not reliant on all voice inputs always being processed both by the onboard speech recognition unit and by the offboard speech recognition unit. A preferred embodiment of the method accordingly provides for the processing device to select and activate one of the following four modes for speech recognition on the basis of at least one control parameter: complete onboard speech recognition, complete offboard speech recognition, sequential speech recognition, as has already been described, parallel speech recognition, as has likewise already been described. This results in the advantage that the speech recognition system can react flexibly. If there is currently no radio link from the motor vehicle to a data network via which the offboard speech recognition unit can be reached, for example, it is nevertheless possible to perform recognition on the basis of the first mode (complete onboard speech recognition). When a radio link exists, one of the other modes can then be selected according to the available bandwidth of the radio link.

Another, particularly suitable control parameter for changeover between the modes is a statement relating to a current operational scenario. In this case, operational scenario means what operator control process the user actually wishes to perform by the speech recognition. If, by way of example, the aim is for simple menu operation to be effected for selecting a menu item in an infotainment system, for example, then the onboard speech recognition unit specialized therefor is normally worthwhile in this case, since it works reliably. Thus, if it is recognized that the user wishes to make a selection in a menu, the first mode with the complete onboard speech recognition can be activated in this case. Equally, in the case of a voice input with the spoken text content: "Google Internet search", for example, one of the other modes can automatically also be activated straightaway, since a transmission channel is set up for the Internet search by a radio module anyway.

As already explained, the inventors also propose an infotainment system for a motor vehicle. This is distinguished in that it has a processing device that is designed to perform an embodiment of the method.

Finally, the inventors propose a motor vehicle. The motor vehicle has a capture device, an onboard speech recognition unit, the processing device already described and a communication device. The capture device is designed to capture a voice input by a user and to output the captured voice input to the processing device. The processing device is the processing device that has already been described for carrying out an embodiment of the method. By way of example, the processing device may be provided in the form of the infotainment system that has already been described. Alternatively, it may be a program module for a central computation unit of the motor vehicle, for example. In connection with the proposals, a communication link is intended to be understood to mean particularly a mobile radio module, for example an LTE module or a UMTS module. Alternatively, it may be a WLAN (wireless local area network) module, for example.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The single FIGURE (FIGURE) shows one possible embodiment of the proposed motor vehicle. The FIGURE shows a motor vehicle 10, which may be a motorcar, particularly an automobile, for example. Furthermore, the FIGURE shows a server arrangement 12 that comprises an offboard speech recognition unit (REM REC—remote recognizer), which may be a speech recognition unit that is known per se from the related art for an ASR.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The invention is described once again below with reference to a specific exemplary embodiment. In this regard, the single FIGURE (FIGURE) shows an embodiment of the motor vehicle. The FIGURE shows a motor vehicle 10, which may be a motorcar, particularly an automobile, for example. Furthermore, the FIGURE shows a server arrangement 12 that comprises an offboard speech recognition unit (REM REC—remote recognizer), which may be a speech recognition unit that is known per se from the related art for an ASR. By way of example, the server arrangement 12 may be part of the Internet 14. By way of example, the server arrangement 12 can be reached from the motorcar 10 via a mobile radio network 16, for example a UMTS network or LTE network, for datacommunication via a biodirectional radio link 18. At the vehicle end, the biodirectional radio link 18 is made possible by a communication module 20 of the motor vehicle 10 in a manner that is known per se.

A user 22 in the motor vehicle 10, for example a driver, can have speech recognition performed in order to be able to operate an appliance 24 in the motor vehicle 10 by voice, for example. By way of example, the dictation of text messages (SMS, e-mail) or the selection of menu entries from an operator control menu by voice input may be possible.

In the example shown, the user 22 does this by speaking a spoken expression 26 (ABC). In this case, the representation in quotation marks "ABC" is used to symbolize that the spoken expression 26 still exists as an audio signal rather than as computer-interpretable spoken text, that is to say e.g. as a character string, e.g. in ASCII format. The voice sound 28 of the spoken expression 26 is captured by a microphone arrangement 30 comprising one or more microphones in the motor vehicle 10, for example, and supplied to a processing device 32 as a voice signal (analog, digital, in the form of feature coefficients). By way of example, the processing device 32 may be part of an infotainment system in the motor vehicle 10 or of a central computer device. The processing device 32 coordinates the speech recognition that converts the spoken expression 26 into a spoken text 34, which is then output to the appliance 24 and possibly further appliances as an input therefor. To this end, the processing device 32 can have four processing modes 36, 38, 40, 42 between which the processing device 32 can change over.

In the mode 36, local speech recognition (LOC—local) is performed, which involves the spoken expression 26 being supplied as a voice input 44 to an onboard speech recognition unit, that is to say a vehicle-internal speech recognition unit 46, which may be designed in a manner known per se. The onboard speech recognition unit (LOC ASR—local ASR) takes the voice input 44 as a basis for producing a first recognition result 48 and outputs said recognition result to the processing device 32. By way of example, the first recognition result 48 may comprise one or more spoken text candidates 50, 52 for the spoken text 34 that is ultimately output as a recognition result.

In the second recognition mode 38, exclusively offboard speech recognition (REM ASR—remote ASR) is performed by the server arrangement 12. To this end, the processing device 32 transmits the spoken expression 26 as a voice input 54 to the server arrangement 12 via the communication device 20. The voice input 54 and the voice input 44 can be transmitted in different formats (as an audio signal (audio stream) or feature coefficients). The second recognition result 56 from the server arrangement 12 is then received by the processing device 32. The recognition result 56 may also comprise one or more spoken text candidates 58, 60.

Since the recognition apparatuses usually provide different types of voice interaction, it is a problem to categorize the type of voice input on the fly and forward it to the suitable speech recognition machine. Following successful recognition, the results from the two recognition apparatuses need to be evaluated and the most relevant one presented to the driver. A subset of the recorded audio needs to be forwarded to the remote recognition apparatus.

The proposed method and devices therefore provide the methodology for combining the use of speech recognition machines onboard and outside. A hybrid voice dialog system of this kind includes four different types of voice interactions:

1) Recognition completely onboard (mode 36): for example voice interaction for commands, lists, etc. Recognition is performed in the main unit.
2) Recognition completely online (mode 38): for example extended search, transcription of voice into text, complex dialogs, etc. Recognition is performed on an online server and results are downloaded to the main unit as text.
3) Hybrid streaming recognition (mode 42, PAR—parallel): a mixture of recognition onboard and online. Audio is processed by the ASR onboard and streamed to a remote server for complex transcription of voice into text at the same time as local commands are detected. Results from the two recognition apparatuses are presented to the driver on the basis of a predefined priority.
4) Hybrid one-shot recognition (mode 40, SEQ—sequential): a mixture of recognition onboard and online. Audio is first of all processed by the ASR onboard for the purpose of keyword detection. On the basis of the detected keyword, a subset of the audio file is extracted and forwarded to an online recognition apparatus.

The four different modes of operation 36, 38, 40, 42 of a hybrid recognition apparatus of this kind are used in the voice dialog system on the basis of the specific operational scenario. In a specific instance of use, the dialog manager can use a combination of the four recognition modes of operation and a change of mode of operation for each dialog voice input. The best mode of operation for a particular dialog is determined by the complexity of the recognition tasks.

In the hybrid recognition modes of operation, the captured spoken expression needs to be extracted in two different ways and forwarded to the two ASRs:

1) Hybrid streaming recognition (mode 42)—in this case, the audio is streamed to the server as soon as a connection is set up. At the same time, the ASR processes the same audio file onboard. As soon as one of the two ASRs signals successful recognition, the result needs to be evaluated and the system must decide whether this result is to be presented to the user or the other ASR is allowed to complete the recognition first. This decision is based on a set of predefined priorities.
2) Hybrid one-shot recognition (mode 40)—in this case, the audio is first of all processed by the ASR onboard. When the recognition onboard is complete, the ASR detects a set of predefined keywords from the audio stream, but also marks a portion of the audio as incomprehensible. This subset of the initial audio stream is extracted and forwarded to the online ASR for extended speech recognition.

The changeover between the modes 36, 38, 40, 42 can be performed by the processing device 32 on the basis of parameter values that are produced by, by way of example, a vehicle-internal sensor system and/or vehicle state monitoring and/or a receiver for vehicle-external state parameters, such as a broadcast radio receiver. The monitored parameters PAR 62 thus generally describe a specific operational scenario, that is to say the situation context in which the recognition of the spoken expression 26 is performed. A typical situation context is the compilation of a message or the operator control of an appliance. It is also possible for the selection of the spoken text candidate 50, 52, 58, 60 from the two recognition results 48, 56 as the final recognition result, that is to say the spoken text 34, to be made by a selection module 62 on the basis of the current parameter values 64 of the operational scenario 62.

The example shows how the proposals can be used to realize the following advantages:

Combination of ASR onboard and online to produce four different modes of operation for speech recognition in the automobile.

Extraction of an audio expression that is to be processed by an online recognition apparatus on the basis of keyword extraction onboard.

Simultaneous speech recognition onboard and online with prioritization of recognition results.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for speech recognition in a motor vehicle, comprising:
receiving voice inputs from a user at a vehicle-internal processing device, the voice inputs being received via a vehicle-internal capture device;
supplying by the processing device:
at least one voice input to a vehicle-internal onboard speech recognition unit for producing a first recognition result of spoken text;
at least one voice input to a vehicle-external offboard speech recognition unit for producing a second recognition result of spoken text;
receiving the first recognition result at the processing device from the onboard speech recognition unit;
receiving the second recognition result at the processing device from the offboard speech recognition unit; and
using the first and second recognition results by the processing device as a basis for automatically ascertaining recognition text corresponding to the voice inputs,
wherein the processing device selects and activates based on a control parameter, one of the following modes for speech recognition purposes:
sequential speech recognition in which keyword recognition is first performed using the onboard speech recognition unit, and then the first recognition result is used to extract at least one recognizable component and at least one unrecognizable component, the at least one recognizable component is used to select the vehicle-external offboard speech recognition unit among a plurality of vehicle-external offboard speech recognition units, and the at least one unrecognizable component is then supplied to the selected vehicle-external offboard speech recognition unit to produce the second recognition result;
parallel speech recognition in which a single voice input is supplied in parallel to the onboard speech recognition unit and independently thereof to the offboard speech recognition unit;
complete onboard speech recognition using the onboard speech recognition unit; and complete offboard speech recognition using the offboard speech recognition unit, and wherein the control parameter on which the processing device bases selection and activation, is a parameter relating to a current operational scenario, the operational scenario indicating what operator control process is meant to be performed by the user by way of the recognition text.

2. The method as claimed in claim 1, wherein the processing device ascertains the recognition text from the first and second recognition results based on a predetermined priority for a predetermined spoken text content.

3. The method as claimed in claim 1, wherein the processing device ascertains the recognition text from the first and second recognition results based on an environmental parameter, which describes a current recognition situation in the motor vehicle, and/or a current vehicle state.

4. The method as claimed in claim 3, wherein
the processing device ascertains the recognition text from the first and second recognition results based on the environmental parameter, and
the environmental parameter describes at least one of whether the motor vehicle is queuing, where the motor vehicle is geographically situated, whether the motor vehicle is at a start of a scheduled route, whether the motor vehicle is at an end of a scheduled route, whether the motor vehicle is being driven to a workplace and whether the motor vehicle is being driven home.

5. The method as claimed in claim 3, wherein
the processing device ascertains the recognition text from the first and second recognition results based on the current vehicle state, and
the current vehicle state relates to at least one of whether a telephone has recently been activated and whether a warning has recently been output to the user.

6. The method as claimed in claim 3, wherein the processing device ascertains the recognition text assuming that the voice inputs relate to the current recognition situation in the vehicle and/or the current vehicle state.

7. The method as claimed in claim 1, wherein the processing device ascertains the recognition text from the first and second recognition results based on preceding operator control actions by the user.

8. The method as claimed in claim 1, wherein the processing device ascertains the recognition text from the first and second recognition results based on statistics from preceding voice inputs.

9. The method as claimed in claim 1, wherein
at least one of the first recognition result and the second recognition result comprises an N-best list with a plurality of spoken text candidates,
the N-best list contains probability information,
the probability information includes at least one of an organization of the spoken text candidates according to rank, and a probability statement for at least one of the spoken text candidates, and
the recognition text is ascertained based on the probability information.

10. The method as claimed in claim 1, wherein
the processing device receives a safety-relevant voice input,
the control parameter identifies the safety-relevant voice input as being safety-relevant, and
the processing device selects and activates complete onboard speech recognition for the safety-relevant voice input.

11. The method as claimed in claim 1, wherein in parallel speech recognition, the single voice input is supplied in different formats to the onboard and offboard speech recognition units.

12. The method as claimed in claim 1, wherein the control parameter relates to at least one of whether there is a radio link to the offboard speech recognition unit, whether a menu selection operation is in process, whether an infotainment system is active, whether internet searching is in progress and whether a text message is in progress.

13. The method as claimed in claim 1, wherein
the processing device receives at least first through fourth voice inputs,
a first control parameter is associated with the first voice input,
the processing device selects and activates sequential speech recognition for the first voice input,
a second control parameter is associated with the second voice input,
the processing device selects and activates parallel speech recognition for the second voice input,
a third control parameter is associated with the third voice input,
the processing device selects and activates complete onboard speech recognition for the third voice input, and
a fourth control parameter is associated with the fourth voice input, and
the processing device selects and activates complete offboard speech recognition for the fourth voice input.

14. The method as claimed in claim 1, wherein
the at least one recognizable component indicates that the at least one voice input relates to a navigation function, and
the selected vehicle-external offboard speech recognition unit among the plurality of vehicle-external offboard speech recognition units is specialized for a navigation system.

15. The method as claimed in claim 1, wherein the control parameter relates to at least one of whether a menu selection operation is in process, whether an infotainment system is active, whether internet searching is in progress and whether a text message is in progress.

16. An infotainment system for a motor vehicle comprising:
a processing device to:
receive voice inputs from a user, the voice inputs being received via a vehicle-internal capture device;
supply:
at least one voice input to a vehicle-internal onboard speech recognition unit to produce a first recognition result of spoken text;
at least one voice input to a vehicle-external offboard speech recognition unit to produce a second recognition result of spoken text;
receive the first recognition result from the onboard speech recognition unit;
receive the second recognition result from the offboard speech recognition unit; and
use the first and second recognition results as a basis for automatically ascertaining recognition text corresponding to the voice inputs,
wherein the processing device selects and activates based on a control parameter, one of the following modes for speech recognition purposes:
sequential speech recognition in which keyword recognition is first performed using the onboard speech recognition unit, and then the first recognition result is used to extract at least one recognizable component and at least one unrecognizable component, the at least one recognizable component is used to select the vehicle-external offboard speech recognition unit among a plurality of vehicle-external offboard speech recognition units, and the at least one unrecognizable component is then supplied to the selected vehicle-external offboard speech recognition unit to produce the second recognition result;

parallel speech recognition in which a single voice input is supplied in parallel to the onboard speech recognition unit and independently thereof to the offboard speech recognition unit;

complete onboard speech recognition using the onboard speech recognition unit; and complete offboard speech recognition using the offboard speech recognition unit, and wherein the control parameter on which the processing device bases selection and activation, is a parameter relating to a current operational scenario, the operational scenario indicating what operator control process is meant to be performed by the user by way of the recognition text.

17. A motor vehicle comprising:
an onboard speech recognition unit;
a capture device to capture voice inputs from a user and to output a captured voice input;
a processing device to:
receive the captured voice input from the capture device;
supply:
  at least one voice input to the onboard speech recognition unit to produce a first recognition result of spoken text;
  at least one voice input to a vehicle-external offboard speech recognition unit to produce a second recognition result of spoken text;
receive the first recognition result from the onboard speech recognition unit;
receive the second recognition result from the offboard speech recognition unit; and
use the first and second recognition results as a basis for automatically ascertaining recognition text corresponding to the voice inputs,
wherein the processing device selects and activates based on a control parameter, one of the following modes for speech recognition purposes:
sequential speech recognition in which keyword recognition is first performed using the onboard speech recognition unit, and then the first recognition result is used to extract at least one recognizable component and at least one unrecognizable component, the at least one recognizable component is used to select the vehicle-external offboard speech recognition unit among a plurality of vehicle-external offboard speech recognition units, and the at least one unrecognizable component is then supplied to the selected vehicle-external offboard speech recognition unit to produce the second recognition result;

parallel speech recognition in which a single voice input is supplied in parallel to the onboard speech recognition unit and independently thereof to the offboard speech recognition unit;

complete onboard speech recognition using the onboard speech recognition unit; and complete offboard speech recognition using the offboard speech recognition unit, and wherein the control parameter on which the processing device bases selection and activation, is a parameter relating to a current operational scenario, the operational scenario indicating what operator control process is meant to be performed by the user by way of the recognition text.

18. A motor vehicle comprising:
an onboard speech recognition unit;
a capture device to capture voice inputs from a user and to output a captured voice input;
a processing device to:
receive the captured voice input from the capture device;
supply:
  at least one voice input to the onboard speech recognition unit to produce a first recognition result of spoken text;
  at least one voice input to a vehicle-external offboard speech recognition unit to produce a second recognition result of spoken text;
receive the first recognition result from the onboard speech recognition unit;
receive the second recognition result from the offboard speech recognition unit; and
use the first and second recognition results as a basis for automatically ascertaining recognition text corresponding to the voice inputs,
wherein the processing device selects and activates based on a control parameter, one of the following modes for speech recognition purposes:
sequential speech recognition in which keyword recognition is first performed using the onboard speech recognition unit, and then the first recognition result is used to extract at least one unrecognizable component, which is then supplied to the offboard speech recognition unit to produce the second recognition result;

parallel speech recognition in which a single voice input is supplied in parallel to the onboard speech recognition unit and independently thereof to the offboard speech recognition unit;
  complete onboard speech recognition using the onboard speech recognition unit; and
  complete offboard speech recognition using the offboard speech recognition unit, and wherein
the control parameter on which the processing device bases selection and activation, is a parameter relating to a current operational scenario, the operational scenario indicating what operator control process is meant to be performed by the user by way of the recognition text, and
the parallel speech recognition comprises:
simultaneously processing the single voice input by the onboard speech recognition unit and the offboard speech recognition unit;
obtaining one of the first recognition result and the second recognition result at a point in time before the other one of the first recognition result and the second recognition result is obtained;
evaluating the one of the first recognition result and the second recognition result; and
determining whether to immediately use the one of the first recognition result and the second recognition result or to wait for processing to be completed by one of the onboard speech recognition unit and the offboard speech recognition unit, so that the other one of the first recognition result and the second recognition result is also obtained.

* * * * *